US United States Patent [19]

Ahoor

[11] Patent Number: 4,498,351
[45] Date of Patent: Feb. 12, 1985

[54] CONTINUOUSLY VARIABLE RATIO TRANSMISSION

[75] Inventor: Rooin Ahoor, Louisville, Ky.

[73] Assignee: Harry B. O'Donnell, III, Louisville, Ky.

[21] Appl. No.: 563,573

[22] Filed: Dec. 20, 1983

Related U.S. Application Data

[63] Continuation-in-part of Ser. No. 245,993, Mar. 20, 1981, abandoned.

[51] Int. Cl.³ ............................................. F16H 55/12
[52] U.S. Cl. ...................................... 74/439; 474/47; 474/49; 474/53
[58] Field of Search ................... 74/439, 460, 457; 474/49, 50, 51, 53, 54, 59, 47

[56] References Cited

U.S. PATENT DOCUMENTS 1,446,294  2/1923  Healey .................................. 474/53
3,087,349  4/1963  Herting ................................. 474/51
3,613,468  10/1971  Rand ................................ 474/51 X

FOREIGN PATENT DOCUMENTS 539981  3/1931  Fed. Rep. of Germany ........ 474/54
821303  7/1949  Fed. Rep. of Germany ........ 474/49

Primary Examiner—James A. Leppink
Assistant Examiner—Frank H. McKenzie, Jr.
Attorney, Agent, or Firm—Harry B. O'Donnell, III

[57] ABSTRACT

This invention provides novel transmission means for interconnecting a rotary output shaft of drive means to a rotary input shaft of means to be driven by the drive means. Basically, the novel transmission means of the present invention comprises gear means mounted on base means for rotary movement relative thereto, with those gear means comprising first, second, third and fourth gears and each of those four gears including a hollow, fluid-receiving, radially inner hub portion that is rotatably mounted to the base means and a radially outer portion that is divided into plural segments, each having a radially outer end that is provided with teeth and a radially inner end comprising an arm mounted within the hollow hub portion for slidable movement relative thereto both towards and away from the radial center of the hub portion. The hub portion of the first gear is connectable to the output shaft, the hub portion of the fourth gear is connectable to the input shaft, and the hub portions of the second and third gears are connected to one another. The novel transmission means further includes first endless chain means engageable with the radially outer portions of the first and second gears to interconnect the same and second endless chain means engageable with the radially outer portions of the third and fourth gears to interconnect the same, as well as means for selectively supplying and removing pressurized fluid to and from the hollow hub portions of the gears for selectively slidably moving the segments of the gears radially outwardly and inwardly with respect to their hub portions.

4 Claims, 5 Drawing Figures

CONTINUOUSLY VARIABLE RATIO TRANSMISSION

CROSS-REFERENCE TO RELATED APPLICATION

This application is a continuation-in-part of my application Ser. No. 245,993, filed Mar. 20, 1981 now abandoned.

BACKGROUND OF THE INVENTION

This invention relates to transmission means for interconnecting a rotary output shaft of drive means to a rotary input shaft of means to be driven by the drive means and, more particularly, to a continuously variable transmission for motor-powered vehicles.

Heretofore, automatic and manually-operated transmissions for motorpowered vehicles have generally consisted of a combination of gears or sheaves having a radius of constant dimension interconnected by various means, such as endless chains, belts and the like. And, while several previous attempts have been made towards the employment in such transmission means of gears or sheaves having a variable radius dimension, as illustrated in U.S. Pat. Nos. 1,446,294; 1,486,590; 3,087,349; 3,230,788; 3,613,468 and 3,798,989, as well as German Pat. Nos. 539,981 and 821,303, these prior-art forms have encountered diverse difficulties in their construction, operation and maintenance which the present invention seeks to mitigate or overcome.

SUMMARY OF THE INVENTION

Basically, the novel transmission means of the present invention comprises gear means mounted on base means for rotary movement relative thereto, with those gear means comprising first, second, third and fourth gears and each of those four gears including a hollow, fluid-receiving, radially inner hub portion that is rotatably mounted to the base means and a radially outer portion that is divided into plural segments each having a radially outer end that is provided with teeth and a radially inner end comprising an arm mounted within the hollow hub portion for slidable movement relative thereto both towards and away from the radial center of the hub portion. The hub portion of the first gear is connectable to the output shaft, the hub portion of the fourth gear is connectable to the input shaft, and the hub portions of the second and third gears are connected to one another. The novel transmission means further includes first endless chain means engageable with the radially outer portions of the first and second gears to interconnect the same and second endless chain means engageable with the radially outer portions of the third and fourth gears to interconnect the same, as well as means for selectively supplying and removing pressurized fluid to and from the hollow hub portions of the gears for selectively slidably moving the segments of the gears radially outwardly and inwardly with respect to their hub portions to thus selectively vary the radius of each of the gears by thus moving the plural segments of each of the gears through several selectively variable radial positions as related to each gear hub portion.

Preferably, the radially outer end of each of the plural gear segments has the general configuration of an arc and the arm of each of the gear segments has its long central axis generally aligned along the radial central axis of that arc.

It is further desirable that guide means be mounted on each of the gear hub portions for synchronizing the slidable movement of the plural gear segments with respect to that gear hub portion so as to substantially equalize the radial spacing of all of the outer portions of the plural gear segments from the radial center of each gear hub portion in all of the several selectively variable radial positions to which said gear segments can be moved by the supplying and removing of the pressurized fluid to and from that gear hub portion.

BRIEF DESCRIPTION OF THE DRAWINGS

The present invention is illustrated in the accompanying drawings, wherein.

DETAILED DESCRIPTION

Figure 1:
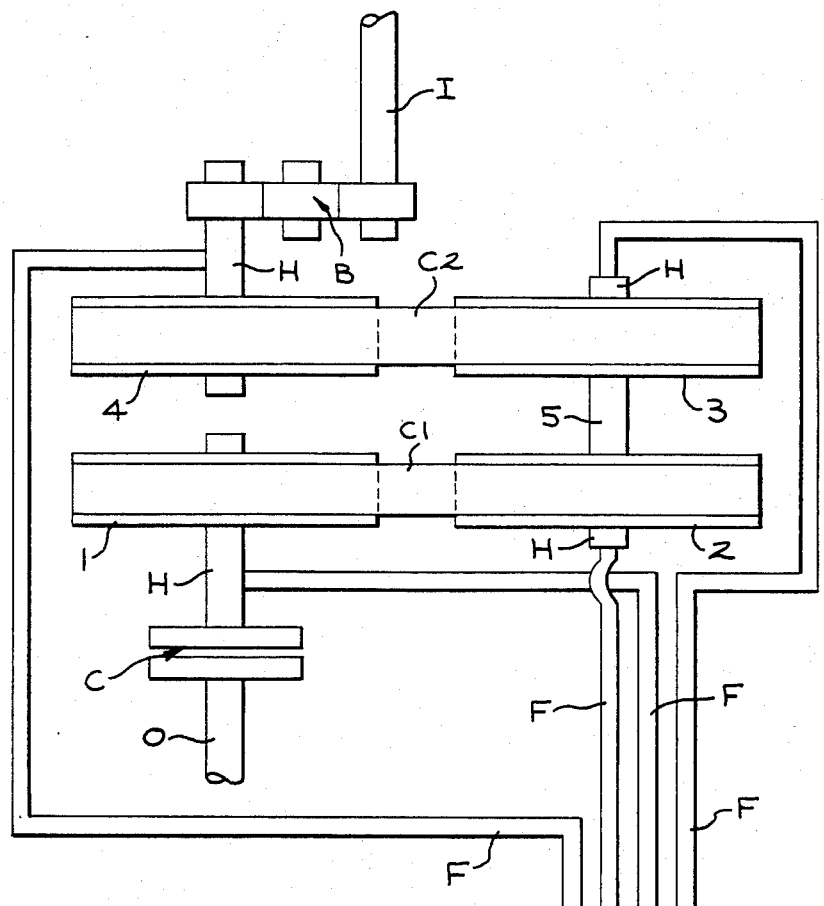
FIG. 1 is a diagramatic top-plan view illustrating one presently preferred form of the novel transmission means that is provided in accordance with the present invention.
Figure 2:
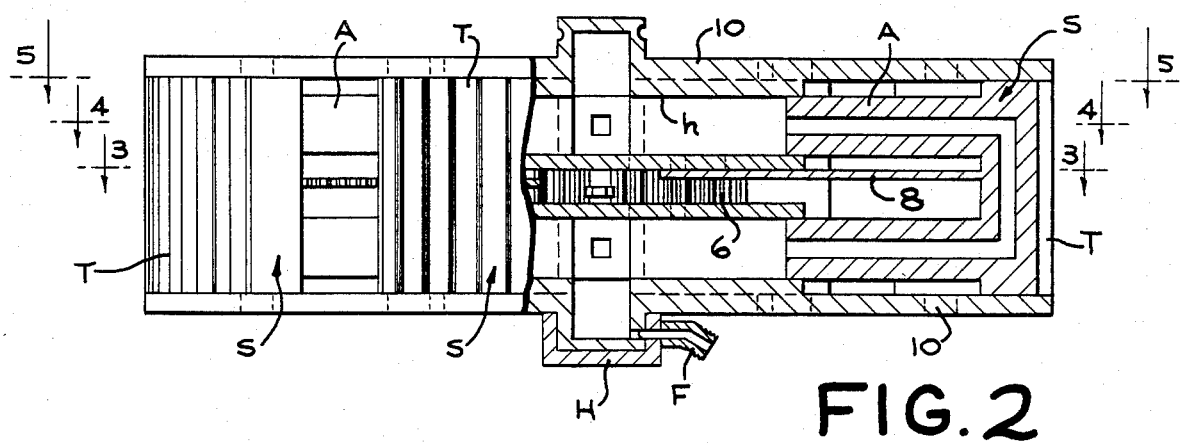
FIG. 2 is a greatly enlarged, partly-broken top plan view of one of the four radially variable gears of the novel transmission means shown in FIG. 1.

Turning now to the drawings and, more particularly, to FIG. 1 thereof, there is shown, diagramatically, a presently preferred form of the novel transmission means that is provided in accordance with the present invention for interconnecting a rotary output shaft O of a drive means (not shown) to a rotary input shaft I of a means to be driven (not shown) by the drive means.

As further shown in drawing FIGS. 1-5, the novel transmission means that is provided in accordance with the present invention basically comprises gear means mounted on base means for rotary movement relative thereto, with those gear means including first 1, second 2, third 3 and fourth 4 variable radius gears and each of those four gears 1, 2, 3 and 4 including a hollow, fluid-receiving radially inner hub portion H that is rotatably mounted to the base means and a radially outer portion that is divided into plural segments S (four as illustrated) each having a radially outer end provided with teeth T and a radially inner end comprising a hollow arm A mounted within a channel h formed in the hollow hub portion H for slidable movement towards and away from the radial center of that hub portion H.

As further illustrated in drawing FIGS. 2-5, the radially outer end of each of the plural gear segments S has the general configuration of an arc and the arm A of each of the gear segments S has its long central axis generally aligned along the radial central axis of that arc.

As yet further shown in drawing FIGS. 1-5, the hub portion H of the first gear 1 is connectable to the output shaft O via a clutch C, the hub portion of the fourth gear 4 is connectable to the input shaft I via an idler reversing gear B and the hub portions H of the second 2 and third 3 gears are connected to one another via a rotatable shaft 5. And, the novel transmission means of the present invention further includes first endless chain means C1 engageable with the radially outer portions T of the first 1 and second 2 gears to interconnect the same and second endless chain means C2 engageable with the radially outer portions T of the third 3 and fourth 4 gears to interconnect the same, as well as means, including: fluid reservoir R; pump means P; and valve means V1, V2, V3 and V4, for selectively supplying and removing pressurized fluid to and from the hollow hub portions H of the gears 1, 2, 3 and 4 via fluid conduit means F for selectively slidably moving the segments S of the gears 1, 2, 3 and 4 radially outwardly and inwardly with respect to their hub portions H to thus selectively vary the radius dimension of each of the gears 1, 2, 3 and 4.

As additionally illustrated in drawing FIGS. 2-5, it is further desirable that guide means be mounted on each of the hub portions H of the four variable radius gears 1, 2, 3 and 4 for synchronizing the slidable movement of the plural gear segments S with respect to that gear hub portion H within the channels h so as to substantially equalize the radial spacing of all of the outer portions of the plural gear segments S from the radial center of each gear hub portions H in all of the several selectively variable radial positions to which those gear segments S of the variable radius gears 1, 2, 3 and 4 can be moved by the supplying and removing of the pressurized fluid to and from that gear hub portion 11 via selective operation of the valves V1, V2, V3 and V4 of the means P, R, V1, V2, V3 and V4 for selectively supplying and removing of fluid that can be stored in the reservoir R and pressurized by the pump P to and from each of the gears 1, 2, 3 and 4 via schematically illustrated fluid conduit means shown in drawing FIG. 1.

As best shown in drawing FIGS. 2-5, the just-noted guide means can comprise idler gears 6 rotatably mounted on the hub portions H of each of the four variable radius gears 1, 2, 3 and 4 on opposite sides of each of the arm-receiving channels h for engagement with ratchet teeth 7 provided upon the radially inner end of a guide rod 8 that is mounted within the hollow arm A of each of the plural gear segments S and also generally aligned along the radial central axis of the generally arc-configured outer portion of each of the variable radius gear segments S so as to substantially equalize the radial spacing of all of the outer portions of the plural gear segments S from the radial center of each of the hub portions H of all four of the variable radius gears 1, 2, 3 and 4 in all of the aforenoted several selectively variable radial positions to which those gear segments S can be moved by supplying and removing of pressurized fluid from the reservoir R via the pump P and fluid conduit means F to and from the gear hub portions H via selective operation of the four valves V1, V2, V3 and V4.

Figure 3:
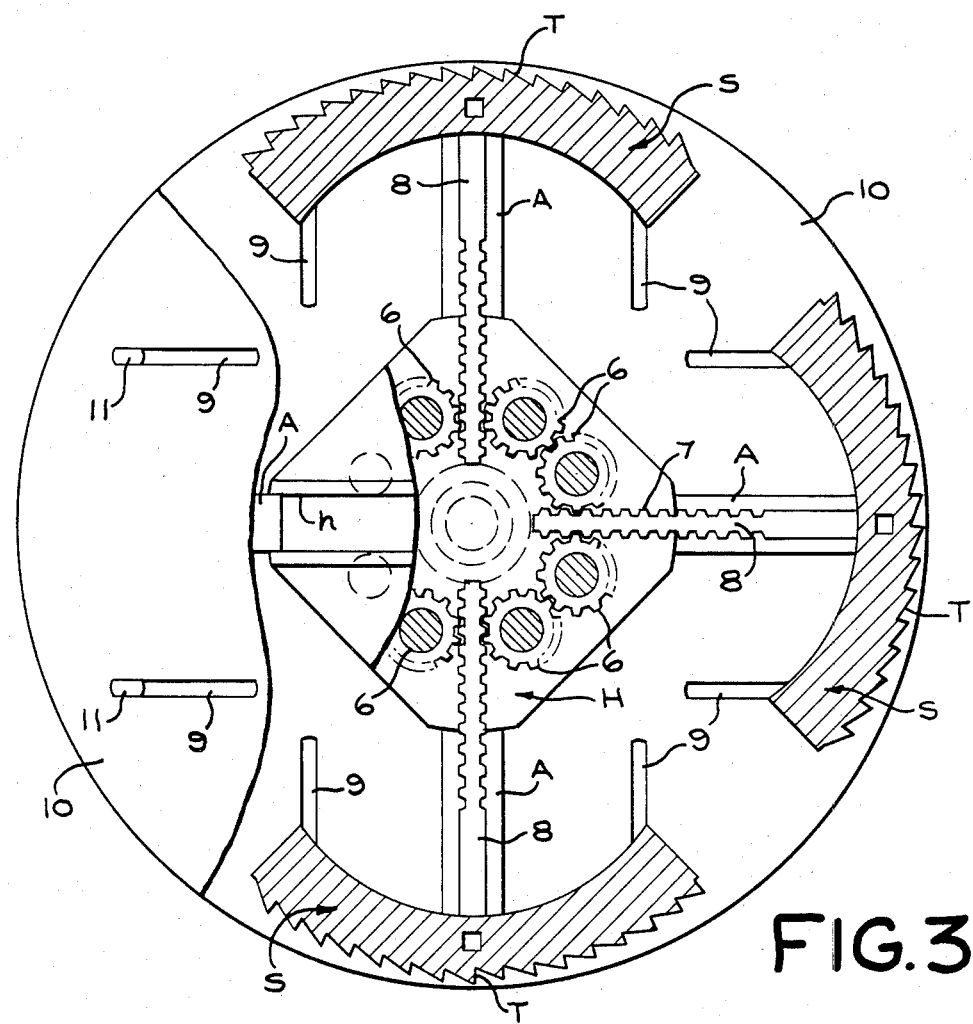
FIG. 3 is a view taken along Line 3—3 of FIG. 2.
Figure 4:
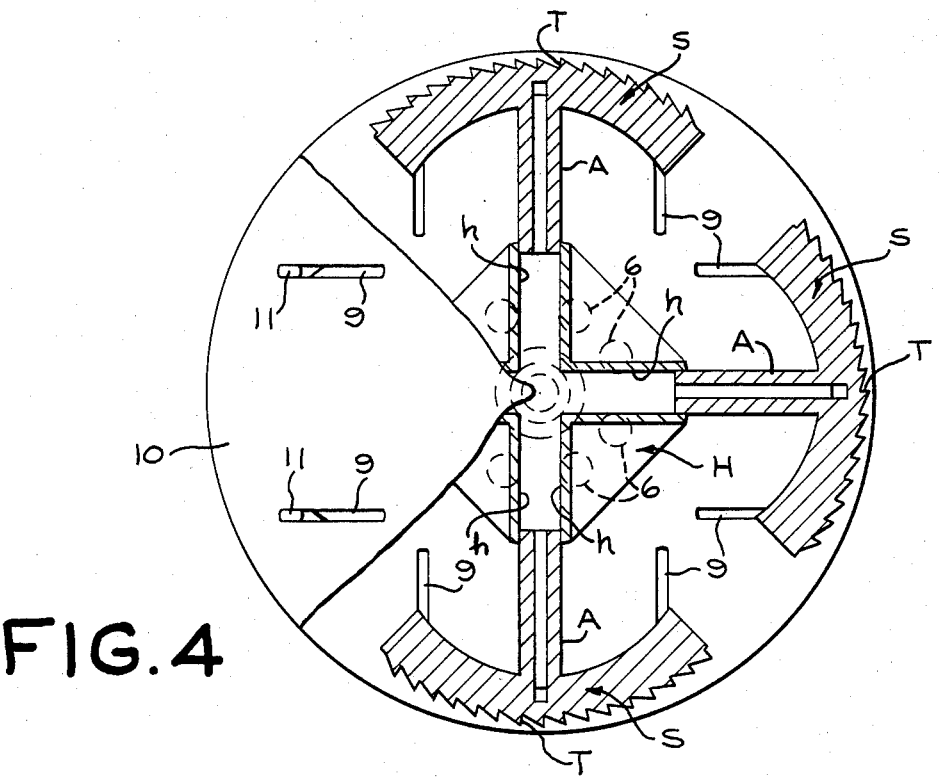
FIG. 4 is a view taken along Line 4—4 of FIG. 2.
Figure 5:
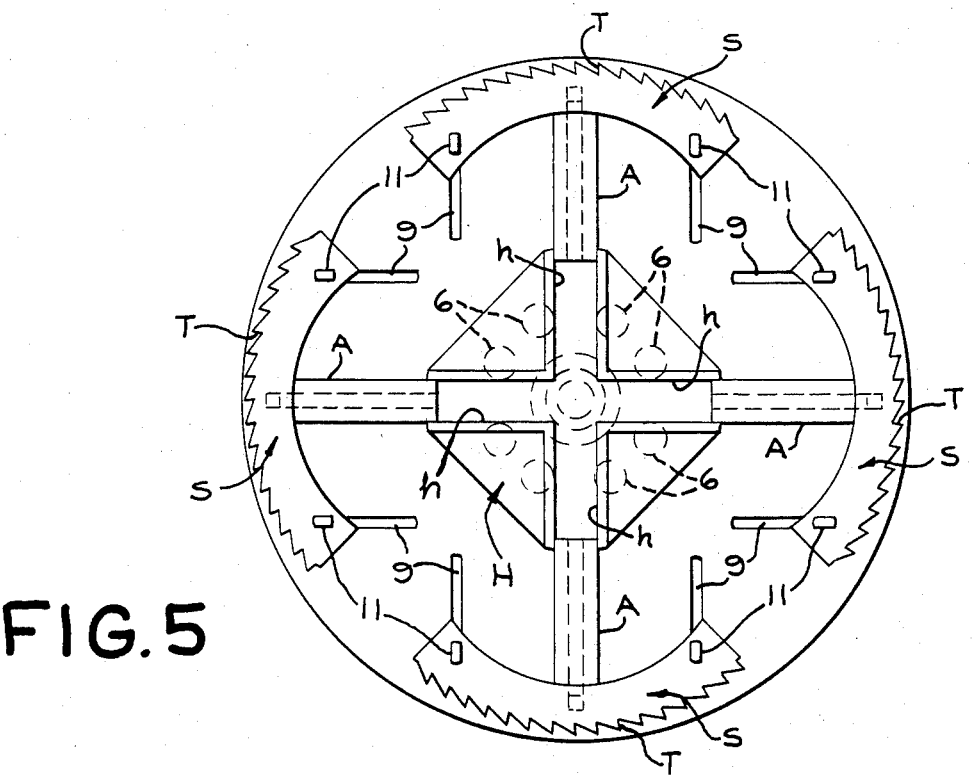
FIG. 5 is a view taken along Line 5—5 of FIG. 2.

Furthermore, with the illustrated four movable gear segments S per each variable radius gear shown in drawing FIG. 3, the teeth of each of the two adjacent idler gears 6 are also meshed with one another such that movement of either one of those two enmeshed idler gears 6 by the arm guide rod ratchet teeth 7 engaged with it will also cause equal radial movement of the other guide rod 8 and the gear segment S to which it is connected.

And, as still further shown in drawing FIGS. 2-5, the aforenoted guide means can further include a pair of elongate guide slots 9 provided in radially outward extensions 10 of the hub portion H of each of the variable radius gears 1, 2, 3 and 4 for receiving for slidable movement therein a pair of guide pins 11 that are respectively mounted adjacent to the circumferentially opposite ends of the generally arc-configured outer end portion of each of the radially movable gear segments S to further guide each such gear segments S in its slidable radial movement with respect to its associated gear hub portion H. As best illustrated in drawing FIGS. 3-5, these paired guide slots 9 are spaced apart from one another with their long axes arranged generally parallel to one another on opposite sides of each arm-receiving channel h of the hollow hub portion H of each of the four variable radius gears 1, 2, 3 and 4.

It should be apparent that while there has been described what is currently considered to be a presently preferred form of the present invention in accordance with the Patent Statutes, changes may be made in the disclosed apparatus without departing from the true spirit and scope of this invention. It is, therefore, intended that the appended claims shall cover such modifications and applications that may not depart from the true spirit and scope of the present invention.

What is claimed is:

1. For interconnecting a rotary output shaft of drive means to a rotary input shaft of means to be driven by said drive means, novel transmission means, comprising:
    (a) gear means mounted on base means for rotary movement relative thereto, with said gear means comprising first, second, third and fourth gears and each of said gears including a hollow, fluid-receiving, radially inner hub portion that is rotatably mounted to said base means and a radially outer portion that is divided into plural segments each having a radially outer end provided with teeth and a radially inner end comprising an arm mounted within said hollow hub portion for slidable movement relative thereto both towards and away from radial center of said hub portion,
    (b) said hub portion of said first gear being connectable to said output shaft, said hub portion of said fourth gear being connectable to said input shaft, and said hub portions of said second and third gears being interconnected to one another;
    (c) first endless chain means engageable with said radially outer portions of said first and second gears to interconnect the same and second endless chain means engageable with said radially outer portions of said third and fourth gears to interconnect the same;
and
    (d) means for selectively supplying and removing pressurized fluid to and from said hollow hub portions of said gears for selectively slidably moving said segments of said gears radially outwardly and inwardly with respect to their said hub portions to thus selectively vary the radius of each of said gears by thus moving said plural segments of each of said gears through several selectively variable radial positions as related to each of said gear hub portions.

2. The invention of claim 1, wherein said radially outer end of each of said gear segments has the general configuration of an arc and said arm of each of said gear segments has its long central axis generally aligned along the radial central axis of said arc.

3. The invention of claim 2, further including guide means mounted on each said gear hub portion for synchronizing the slidable movement of said plural gear segments with respect to said gear hub portion so as to substantially equalize the radial spacing of all said outer portions of said plural gear segments from the radial center of said gear hub portion in all of said several selectively variable radial positions to which said gear segments can be moved by the supplying and removing of pressurized fluid to and from said gear hub portion.

4. The invention of claim 1, further including guide means mounted on each said gear hub portion for synchronizing the slidable movement of said plural gear segments with respect to said gear hub portion so as to substantially equalize the radial spacing of all said outer portions of said plural gear segments from the radial center of said gear hub portion in all of said several selectively variable radial positions to which said gear segments can be moved by the supplying and removing of pressurized fluid to and from said gear hub portion.

* * * * *